United States Patent
Guo et al.

(10) Patent No.: US 10,466,117 B2
(45) Date of Patent: Nov. 5, 2019

(54) TEMPERATURE SENSOR AND TEMPERATURE SENSING SYSTEM BASED ON ACTIVE PHASE-SHIFTED FIBRE GRATING

(71) Applicant: Laser Institute of Shandong Academy of Science, Ji'ning, Shandong (CN)

(72) Inventors: Jian Guo, Ji'nan (CN); Chang Wang, Ji'nan (CN); Jiasheng Ni, Ji'nan (CN); Gangding Peng, Ji'nan (CN); Zhiqiang Song, Ji'nan (CN); Haifeng Qi, Ji'nan (CN); Weitao Wang, Ji'nan (CN)

(73) Assignee: LASER INSTITUTE OF SHANDONG ACADEMY OF SCIENCE, Ji'Ning (CN)

( * ) Notice: Subject to any disclaimer, the term of this patent is extended or adjusted under 35 U.S.C. 154(b) by 211 days.

(21) Appl. No.: 15/605,029

(22) Filed: May 25, 2017

(65) Prior Publication Data
US 2018/0100773 A1   Apr. 12, 2018

(30) Foreign Application Priority Data

Oct. 12, 2016 (CN) .......................... 2016 1 0889026

(51) Int. Cl.
*G01K 11/32* (2006.01)
(52) U.S. Cl.
CPC ................ *G01K 11/3206* (2013.01)
(58) Field of Classification Search
CPC .............................................. G01K 11/3206
See application file for complete search history.

(56) References Cited

U.S. PATENT DOCUMENTS 5,844,927 A * 12/1998 Kringlebotn ............ G01F 1/383
372/6

FOREIGN PATENT DOCUMENTS

CN        202562653 U       11/2012

OTHER PUBLICATIONS

Hadeler, "Distributed Feedback Fibre Laser Strain and Temperature Sensors", (2001), University of Southampton Department of Electronics and Computer Science, Optoelectronics Research Centre, PhD Thesis (Year: 2001).*

(Continued)

*Primary Examiner* — Clayton E. LaBalle
*Assistant Examiner* — Leon W Rhodes, Jr.
(74) *Attorney, Agent, or Firm* — Renaissance IP Law Group, LLP; David A. Crowther

(57) ABSTRACT

Provided are a temperature sensor and an active phase-shifted grating-based temperature sensing system, relating to a fiber sensing technical field. The temperature sensor comprises a pump laser, a wavelength division multiplexer, an optical detector and an active phase-shifted fiber grating with $\pi$ phase shift. Pump light emitted by the pump laser enters the active phase-shifted fiber grating through the wavelength division multiplexer. The active phase-shifted fiber grating absorbs the pump light and emits laser light, which travels back through the wavelength division multiplexer and enters the optical detector. The optical detector measures output power of the active phase-shifted fiber grating, to analyze the power to obtain ambient temperature of the active phase-shifted fiber grating. Compared with wavelength demodulation based fiber grating sensors, this temperature sensor can obtain ambient temperature of the active phase-shifted fiber grating solely by analyzing output power of the active phase-shifted fiber grating measured by the optical detector.

18 Claims, 6 Drawing Sheets

(56) References Cited

OTHER PUBLICATIONS

Zhang et al, "Analysis on intensity demodulated strain sensing based on multiple phase-shifted FBG." In Advanced Sensor Systems and Applications VI, vol. 9274, p. 92740C. International Society for Optics and Photonics, 2014. (Year: 2014).*
Bibliographic record of University of Southampton Institutional Repository for Hadeler (Year: 2007).*
Front matter of vol. 9274 of SPIE Proceedings, Dec. 2014 (Year: 2014).*
DFB Optical Fiber Laser and Its Use; Department of Electronic Engineering of Tsinghua University; pp. 542 and 543.

* cited by examiner

TEMPERATURE SENSOR AND TEMPERATURE SENSING SYSTEM BASED ON ACTIVE PHASE-SHIFTED FIBRE GRATING

RELATED APPLICATION DATA

This application claims priority under 35 USC § 119 to Chinese Patent Application No. 201610889026.5, filed on Oct. 12, 2016 in the State Intellectual Property Office (SIPO) of the People's Republic of China, the contents of which are herein incorporated by reference in their entirety.

TECHNICAL FIELD

Embodiments of the present invention relate to the technical field of optical fibre sensing, and particularly to a temperature sensor and a temperature sensing system based on an active phase-shifted fibre grating.

BACKGROUND

Fibre Bragg Grating (FBG) utilizes photosensitivity to inscribe a periodic variation in the index of refraction of selected optical fibre core, wherein the reflectivity of a fibre core is periodically modulated, so as to form a narrow-band (transmissive or reflective) filter or reflector. When it is affected by physical parameters such as external environment temperature, pressure and so on, its grating period or effective index of refraction will change, and thereby induces drifting of the Bragg peak reflection wavelength. Currently, FBG-based sensors are widely used in applications of environmental physical parameter measurements.

The FBG-based sensors have the advantages such as electro-magnetic interference immunity, corrosion resistance, array multiplexing convenience, and so on, however they also suffers from the intrinsic defects within the FBG principle, especially when the FBG is used as a temperature sensor, since the FBG temperature sensing is based on wavelength demodulation, and both axial force along the fibre and temperature fluctuation can cause Bragg wavelength shift, which leads to crosstalk between the detected strain and temperature variation, and thus deteriorate the measurement accuracy. Furthermore, the wavelength/temperature sensitivity of the FBG generally is 10 pm/° C., which requires complex and expensive demodulation devices such as high-resolution spectrometers, scan Fabry-Perot interferometers or edge filters combined with a tunable laser, thus resulting in high system cost and low portability.

SUMMARY

Embodiments of the present invention provide a temperature sensor and a temperature sensing system based on an active phase-shifted fibre grating, so as to effectively overcome the above shortcomings.

In some embodiments, an example of the present invention provides a temperature sensor based on an active phase-shifted fibre grating, comprising a pump laser, a wavelength division multiplexer, an optical detector and an active phase-shifted optical fibre grating with $\pi$ phase shift. Pump light, emitted by the pump laser, passes through the wavelength division multiplexer and enters the active phase-shifted optical fibre grating, then the active phase-shifted fibre grating absorbs the pump light and emits laser light, which travels back through the wavelength division multiplexer and enters the optical detector. The optical detector is used to measure the output power of the received laser light from the active phase-shifted optical fibre grating, so as to analyze the power to obtain the ambient temperature of the active phase-shifted optical fibre grating, wherein the output power of the laser light from the active phase-shifted optical fibre grating and the ambient temperature of the active phase-shifted optical fibre grating are in a predetermined relation with each other.

In some embodiments, the active medium of the above active phase-shifted optical fibre grating is an erbium doped optical fibre. In some embodiments, the above pump light has a wavelength of 1,480 nanometers. In some embodiments, the above active phase-shifted optical fibre grating is an active phase-shifted optical fibre grating with an asymmetrical structure. In some embodiments, the phase shift position of the above active phase-shifted optical fibre grating is closer to the pump light input end of the active phase-shifted optical fibre grating.

In some embodiments, the above temperature sensor based on an active phase-shifted fibre grating further comprises an optical isolator, wherein the optical isolator is provided between the active phase-shifted optical fibre grating and the optical detector, and the laser light output from the active phase-shifted optical fibre grating, passes through the optical isolator and enters the optical detector.

In some embodiments, the laser light output from the above active phase-shifted optical fibre grating, passes through the wavelength division multiplexer and the optical isolator in sequence and enters the optical detector. In some embodiments, the above optical detector is embodied as an optical power meter.

In some embodiments, the above active phase-shifted optical fibre grating is an active phase-shifted optical fibre grating package obtained by conducting a specific packaging process on an original active phase-shifted optical fibre grating, and the specific packaging process comprises: immersing the original active phase-shifted optical fibre grating into a U-shaped groove filled with silicone grease or silicone oil; bonding and fixing both grating pigtails of the original active phase-shifted optical fibre grating with the U-shaped groove through a thermosetting adhesive respectively, to make the original active phase-shifted optical fibre grating remain in a free state without an axial stress; inserting the remain protruding part of both grating pigtails into a plastic sleeve, respectively; inserting both ends of the U-shaped groove, together with the plastic sleeves, into corresponding heat-melt tubes; inserting the heat-melt tubes, together with the U-shaped groove, into a heat-shrinkable tube; performing thermal treatment on the heat-melt tubes and the heat-shrinkable tube so that the heat-melt tubes and the heat-shrinkable tube, after shrunk by heating, make the plastic sleeves and the U-shaped groove integrated as one piece.

In another aspect, an example embodiment of the present invention further provides temperature sensing system based on an active phase-shifted fibre grating, comprising a data processing unit and the above active phase-shifted grating-based temperature sensor. The temperature sensor comprises a pump laser, a wavelength division multiplexer, an optical detector and an active phase-shifted optical fibre grating. The optical detector is coupled with the data processing unit. Pump light, emitted by the pump laser, passes through the wavelength division multiplexer and enters the active phase-shifted optical fibre grating, then the active phase-shifted fibre grating absorbs the pump light and emits laser light, which travels back through the wavelength division multiplexer and enters the optical detector, and the optical detector converts the measured power into an electrical signal which is then sent to the data processing unit. The data processing unit is used to analyze the electrical signal according to a calibrated equation to obtain the ambient temperature of the active phase-shifted optical fibre grating.

The temperature sensor and the temperature sensing system based on an active phase-shifted fibre grating provided in the examples of the present invention use the active phase-shifted optical fibre grating with π phase shift as laser resonant cavity and gain medium, which forms, together with the pump laser, a distributed feedback optical fibre laser to output narrow-linewidth laser light. It should be understood that the active phase-shifted optical fibre grating is a π phase shifted optical fibre grating written on a rare earth ion-doped photosensitive optical fibre. Since the absorption section of the rare earth ions will shift as ambient temperature changes, the gain coefficient of the doped photosensitive optical fibre will change, which will lead to the change of the fibre laser output power. Therefore, the relation between the output power of the active phase-shifted optical fibre grating and the ambient temperature of the active phase-shifted optical fibre grating can be further obtained linearly, thus through analyzing the measured output power of the fibre laser, the ambient temperature of active phase-shifted fibre grating can be calculated.

The whole temperature sensing process needs not involve any wavelength demodulation, therefore fundamentally averts the strain-temperature crosstalk which exists in most FBG-based sensor systems. Besides, the optical detector of the temperature sensor provided in the examples of the present invention is an optical power meter, which has lower cost, and is easier to be integrated and much more portable compared to traditional high-resolution spectrometer or other wavelength demodulation devices.

BRIEF DESCRIPTION OF THE DRAWINGS

In order to explain the technical solutions of the embodiments of the present invention more clearly, the following drawings will be introduced briefly below. The drawings described below are merely illustrative of some embodiments of the present invention, and are therefore not to be considered limiting its scope, and it would be understood by those skilled in the art that other relevant drawings could be derived from these drawings without using any inventive effort.

Figure 1:
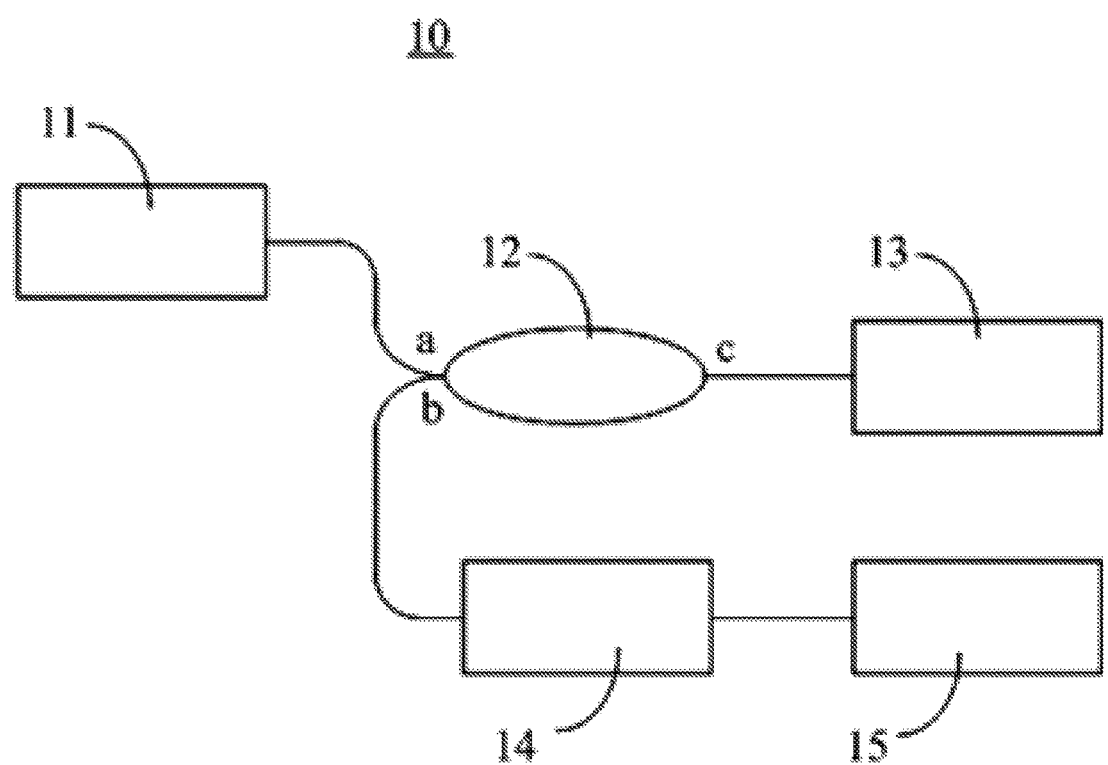
FIG. 1 is a structural schematic view of a temperature sensor based on an active phase-shifted fibre grating provided in a first example of the present invention.

Reference numerals: 10—temperature sensor; 11—pump laser; 12—wavelength division multiplexer; 13—active phase-shifted optical fibre grating; 14—optical isolator; 15—optical detector; 16—data processing unit; 20—temperature sensing system; 131—original active phase-shifted optical fibre grating; 132—U-shaped groove; 133—thermo-setting adhesive; 134—silicone grease or silicone oil; 135—heat-melt tube; 136—plastic sleeve; 137—heat-shrinkable tube; 138—sealant; 139—silicone grease; 140—metal bushing; 141—grating pigtail.

DETAILED DESCRIPTION OF THE EMBODIMENTS

In order to make the technical solutions and advantages of the embodiments of the present invention more clear, the technical solutions of the embodiments of the present invention will be described below clearly and completely with reference to the drawings of the embodiments of the present invention. It is apparent that the described embodiments are some, but not all of the embodiments of the present invention. Generally, the components of the embodiments of the present invention described and illustrated in the figures herein may be arranged and designed in a wide variety of different configurations.

Thus, the following detailed description of the embodiments of the present invention, as represented in the figures, is not intended to limit the scope of the present invention as claimed, but is merely representative of the selected embodiments of the present invention. All the other embodiments obtained by those skilled in the art based on the embodiments of the present invention without using inventive efforts will fall within the protection scope of the present invention.

It should be noted that the similar reference numerals and letters refer to the similar items in the following figures, and thus once an item is defined in one figure, it does not need to be further defined or explained in the following figures.

In the description of the present invention, it should be indicated that orientation or positional relations indicated by the terms such as "center," "upper," "lower," "left," "right," "vertical," "horizontal," "inner," and "outer" and so on are based on the orientation or position relations as shown in the drawings, or the orientation or position relations in which the inventive product is conventionally placed in use, and these terms are only intended to facilitate the description of the present invention and simplify the description, but not to indicate or imply that the referred devices or elements must be in a particular orientation, or constructed or operated in the particular orientation, and therefore it should not be construed as limiting the present invention. In addition, the terms such as "first," "second," and "third" are used only for distinguishing the description, and should not be understood as indicating or implying to have importance in relativity.

In the present description, it also should be understood that unless otherwise expressly specified and defined, terms "arrangement," "installation," "coupling," and "connection" should be understood widely; for example, a "coupling" may be a direct coupling or a communication connection between two elements. Alternatively, a "coupling" may be an indirect coupling or communication connection through some communication interfaces or modules, and may be electrical, mechanical or in other forms. For a person ordinarily skilled in the art, the specific meanings of the above-mentioned terms in the present disclosure can be understood under specific circumstances.

A first example embodiment of the present invention includes a temperature sensor based on an active phase-shifted fibre grating. As shown in FIG. 1, the temperature sensor 10 comprises a pump laser 11, a wavelength division multiplexer 12, an optical detector 15 and an active phase-shifted optical fibre grating 13 with π phase shift. Pump light, emitted by the pump laser 11, passes through the wavelength division multiplexer 12 and enters the active phase-shifted optical fibre grating 13. Then the active phase-shifted fibre grating 13 absorbs the pump light and emits laser light, which travels back through the wavelength division multiplexer 12 and enters the optical detector 15. Output power of the laser light from the active phase-shifted optical fibre grating 13 and the ambient temperature of the active phase-shifted optical fibre grating 13 are in a predetermined relation with each other. Therefore, by measuring the output power of the active phase-shifted optical fibre grating 13 by the optical detector 15, the ambient temperature of the active phase-shifted optical fibre grating 13 can be obtained just by further analyzing measured optical power.

In the above example, the pump laser 11 and the active phase-shifted optical fibre grating 13 having π phase shift form a distributed feedback optical fibre laser. This distributed feedback optical fibre laser uses the active phase-shifted optical fibre grating 13 as a laser resonant cavity and gain medium, and has advantages of extremely narrow linewidth, low relative intensity, and stable single-longitudinal-mode operation. When the ambient temperature of the active phase-shifted optical fibre grating 13 changes, the absorption cross section of a rare-earth ion-doped fibre of the active phase-shifted optical fibre grating 13 will shift, thereby causing change of the gain coefficient of the active optical fibre, and further leading to change of the output power of the active phase-shifted optical fibre grating 13. The relation between the output power of the active phase-shifted optical fibre grating 13 and the ambient temperature of the active phase-shifted optical fibre grating 13 can be obtained just by means of a pre-calibrated manner.

In some embodiments, the above active phase-shifted optical fibre grating 13 is a phase-shifted optical fibre grating, having π phase shift, written on an active optical fibre doped with rare earth (e.g., erbium, ytterbium and so on) ions. The above active optical fibre doped with rare earth (e.g., erbium, ytterbium and so on) ions is the active medium of the above active phase-shifted optical fibre grating 13.

In some embodiments, the above active phase-shifted optical fibre grating 13 is designed to have an asymmetrical structure, so as to improve the intensity of the narrow-linewidth laser light output by the above active phase-shifted optical fibre grating 13, thus improving the measurement accuracy of the temperature sensor 10. An active phase-shifted optical fibre grating 13 having a symmetrical structure with π phase shift located at the middle of a grating region may also be used in the present example, but compared with the active phase-shifted optical fibre grating 13 with an asymmetrical structure, the active phase-shifted optical fibre grating 13 with a symmetrical structure forms a distributed feedback optical fibre laser with a lower laser light slope efficiency. In other words, with the same pump light excitation, the intensity of the laser light output is decreased, so that the measurement accuracy of the present temperature sensor 10 is lower.

Furthermore, in order to enable the active phase-shifted optical fibre grating 13 to output narrow-linewidth laser light with higher intensity, so as to increase the sensor detectivity, as a preferable embodiment, active phase-shifted optical fibre grating 13 is set to be asymmetrical structured where the π phase shift is put closer to a pump light input end of the active phase-shifted optical fibre grating 13 relative to the middle of the grating region of the active phase-shifted optical fibre grating 13.

Further, in some embodiments, the active medium of the above active phase-shifted optical fibre grating 13 is an erbium doped optical fibre. As temperature rises, the erbium ion absorption cross section will red shift, leading to decrease in the gain coefficient of the erbium doped optical fibre, thereby causing decrease in output power of the active phase-shifted optical fibre grating 13.

It should be indicated that in order to improve the temperature sensing accuracy, and to avoid interference of other external parameters as much as possible, a packaged active phase-shifted optical fibre grating 13 is used as the active phase-shifted optical fibre grating 13 in the present example. There are a lot of ways to package the active phase-shifted optical fibre grating 13. For example, in the present example, the packaged active phase-shifted optical fibre grating 13 can be obtained by the following specific package process.

First, immersing an original active phase-shifted optical fibre grating 131 into a U-shaped groove 132 filled with silicone grease or silicone oil 134; bonding and fixing grating pigtails 141 at both ends of the original active phase-shifted optical fibre grating 131 with the U-shaped groove 132 through a thermosetting adhesive 133 respectively, to make the original active phase-shifted optical fibre grating 131 remain in a free state without an axial stress; inserting the remain protruding part of both grating pigtails into a plastic sleeve 136, respectively; inserting both ends of the U-shaped groove 132, together with the plastic sleeves 136 into corresponding heat-melt tubes 135; inserting the heat-melt tubes 135, together with the U-shaped groove 132, into a heat-shrinkable tube 137; performing thermal treatment on the heat-melt tubes 135 and the heat-shrinkable tube 137, so that the heat-melt tubes 135 and the heat-shrinkable tube 137, after shrunk by heating, make the plastic sleeves 136 and the U-shaped groove 132 integrated as one piece, and meanwhile, the heat-shrinkable tube 137 shrinks to make the silicone grease or silicone oil 134 sealed within the U-shaped groove 132.

Figure 2:
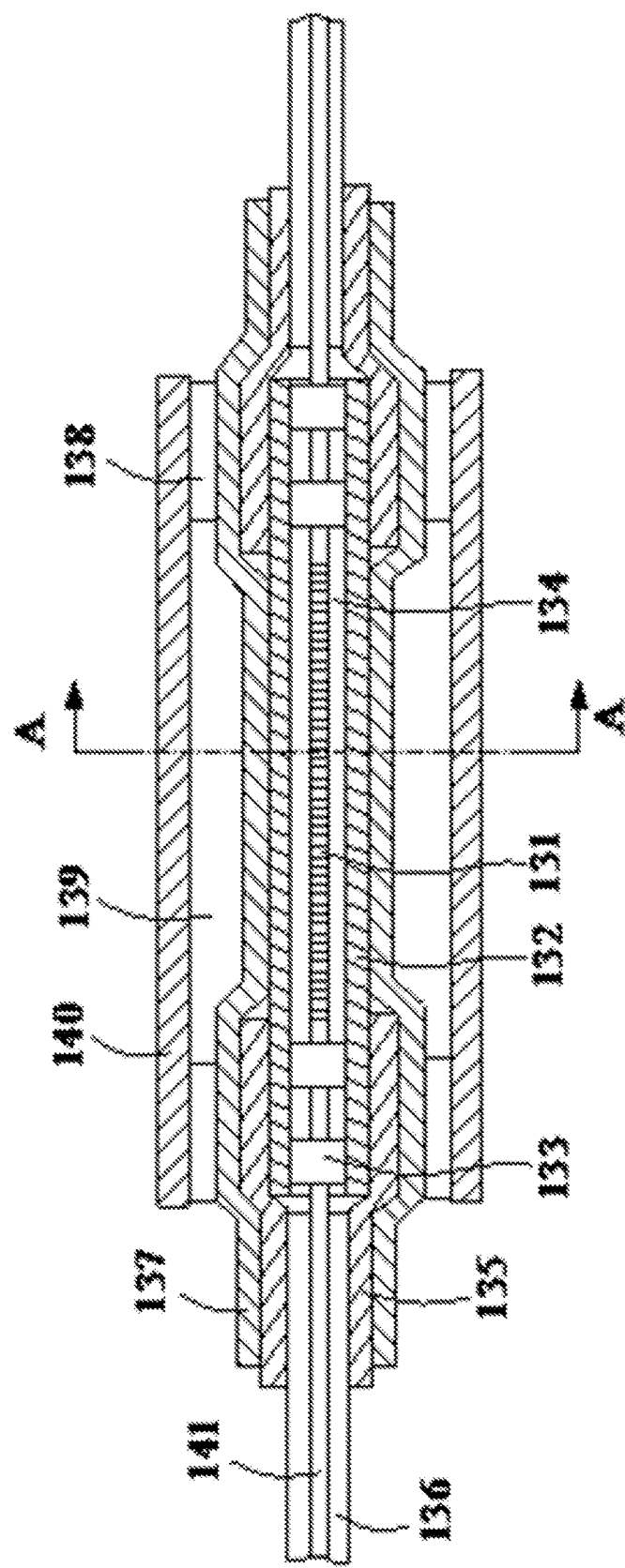
FIG. 2 is a structural schematic view of a packaging structure of an active phase-shifted optical fibre grating provided in the first example of the present invention.
Figure 3:
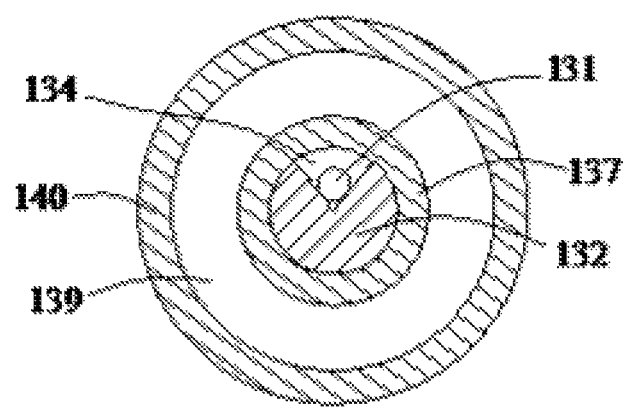
FIG. 3 is an A-A cross-section view of FIG. 2.

In the present example, the U-shaped groove 132 preferably is a quartz U-shaped groove. Further, the heat-shrinkable tube 137 is externally provided with a metal bushing 140, a sealant 138 is coated at mouths of the metal bushing, and a silicone grease 139 is filled between an inner wall of the metal bushing 140 and the heat-shrinkable tube 137. The structure of the encapsulated active phase-shifted optical fibre grating 13 is shown in FIG. 2. FIG. 3 is a cross-section taken along line A-A of FIG. 2. It will be understood that the package structure of the active phase-shifted optical fibre grating 13 in the present example is not merely limited to the above structure, but other package structures also can be used.

Specifically, the pump laser 11 can be a semiconductor laser, or other lasers or laser diodes that can emit the desired pump light. When the active medium of the active phase-shifted optical fibre grating 13 is the erbium doped optical fibre, the pump laser 11 can be a pump laser 11 with an output wavelength of 980 nanometers (nm) or 1,480 nm.

Further, in some embodiments, when the active medium of the active phase-shifted optical fibre grating 13 is the erbium doped optical fibre, pump light of 1,480 nm is used for pumping. In other words, the pump laser 11 is a pump laser with an output wavelength of 1,480 nm. The reason why the pump light of 1,480 nm, rather than the more common pump light of 980 nm, is used in the present example is that the inventor has found through research that change of the erbium ion absorption cross section around 1,480 nm wavelength with the temperature is much more significant than that around 980 nm wavelength. It means that with the same temperature change, when the same active phase-shifted optical fibre grating 13 is pumped respectively by using the pump light of 1,480 nm and the pump light of 980 nm with the same power, output power of the active phase-shifted optical fibre grating 13 pumped by the pump light of 1,480 nm has larger variation.

Following is a description of an example embodiment demonstrating this technique. A 1,480 nm pump laser 11 and a 980 nm pump laser 11 are respectively used to pump the same active phase-shifted optical fibre grating 13 doped with erbium ions. The ambient temperatures of the active phase-shifted optical fibre gratings 13 are respectively made to be heated from 30° C. to 120° C. within 800 seconds. Changes of the measured output power of the active phase-shifted optical fibre gratings 13 are as shown in FIG. 4.

Figure 4:
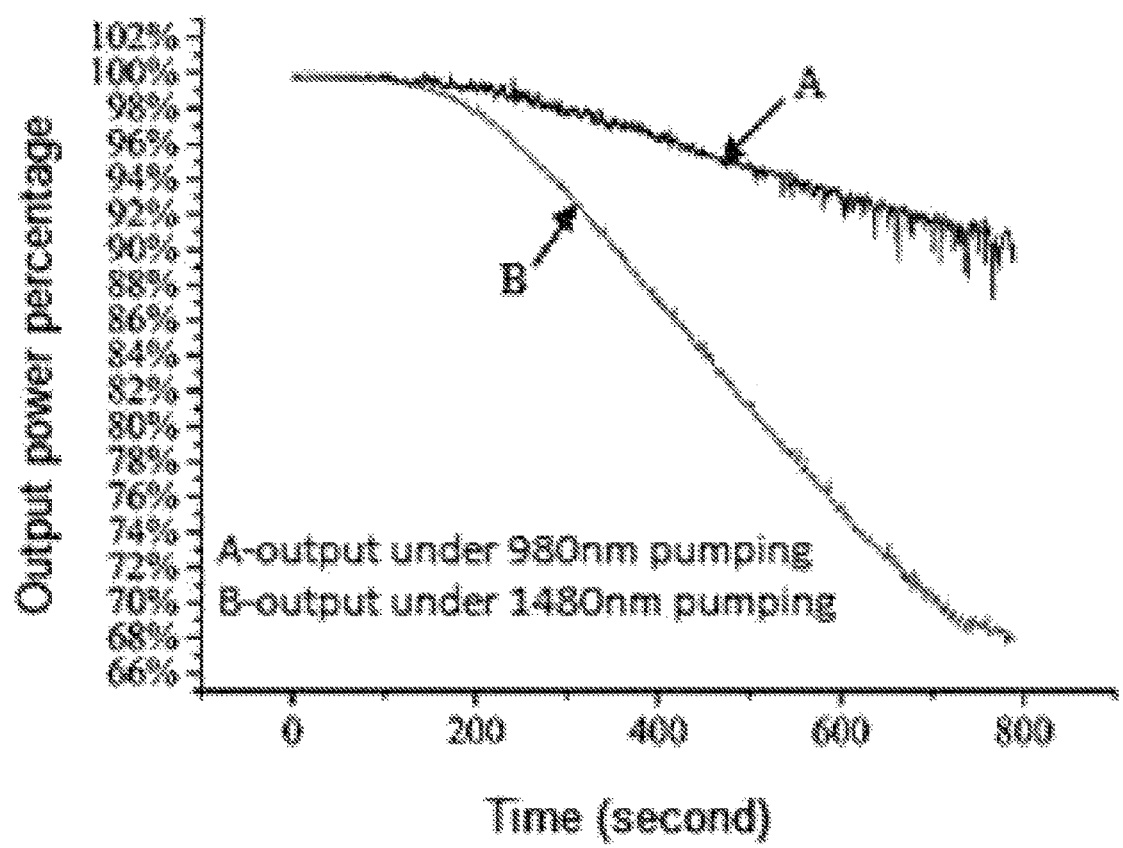
FIG. 4 is a diagram showing changes of output power of the same active phase-shifted optical fibre grating provided in the first example of the present invention during a heating process within 800 seconds under 980 nm pumping and 1,480 nm pumping.

In FIG. 4, the x axis represents time in second, the y axis represents normalized output power percentage of the active phase-shifted optical fibre gratings 13, curve A represents a change of the output power of the active phase-shifted optical fibre grating 13 during the heating process within 800 seconds under 980 nm pump, and the curve B represents a change of the output power of the active phase-shifted optical fibre grating 13 during a heating process within 800 seconds under 1,480 nm pump. The normalized output power percentage is obtained by taking the output power of the active phase-shifted optical fibre grating 13 at an initial moment, i.e. when the temperature is 30° C., as a reference, and dividing the output power of the active phase-shifted optical fibre grating 13 at different moment by the reference and then multiplying by 100%.

It can be seen clearly from FIG. 4 that under the same temperature change, when the same active phase-shifted optical fibre grating 13 is pumped respectively by using 1,480 nm pump and 980 nm pump with the same power, laser output power of the active phase-shifted optical fibre grating 13 pumped by 1480 nm pump has a larger variation. Therefore, in the present example, 1,480 nm pump is preferably used to pump the active phase-shifted optical fibre grating 13 doped with the erbium ions.

Moreover, when the active medium of the active phase-shifted optical fibre grating 13 is the erbium doped optical fibre, a 1,550 nm single-mode optical fibre is usually used for connection between the wavelength division multiplexer 12 and the active phase-shifted optical fibre grating 13, and in the conventional 1,550 nm single-mode optical fibre, transmission loss of the 980 nm pump is much larger than that of the 1,480 nm pump. Therefore, considering the feasibility of the temperature sensor 10 provided in the present example in long-distance sensing applications, 1,480 nm pump is also preferably used to pump the active phase-shifted optical fibre grating 13 doped with the erbium ions.

Further, in order to avoid optical fibre back reflection and improve the light transmission efficiency, the temperature sensor 10 provided in the present example further comprises an optical isolator 14. The optical isolator 14 is provided between the active phase-shifted optical fibre grating 13 and the optical detector 15. Narrow-linewidth laser light, output by the active phase-shifted optical fibre grating 13, passes through the optical isolator 14 and enters the optical detector 15.

In the present example, the wavelength division multiplexer 12 comprises a first connection port a, a second connection port b and a common port c. The first connection port a is used to input the pump light, and connected with the pump laser 11. The second connection port b is used to output the narrow-linewidth laser light generated by the active phase-shifted optical fibre grating 13, and connected with one end of the optical isolator 14. The other end of the optical isolator 14 is connected with the optical detector 15. The common port c is connected with one end of the active phase-shifted optical fibre grating 13. That is to say, the narrow-linewidth laser light, output by the active phase-shifted optical fibre grating 13, passes through the wavelength division multiplexer 12 and the optical isolator 14 in sequence and enters the optical detector 15. Moreover, in some embodiments, the π phase shift position of the active phase-shifted optical fibre grating 13 in an asymmetrical structure is put closer to the common port c of the wavelength division multiplexer 12.

Since the laser light from the active phase-shifted optical fibre grating 13, has an extremely narrow linewidth and high energy density, change of its output power can be easily measured. Therefore, the present example has low requirement on the resolution of the optical detector 15. In the present example, the optical detector 15 can be embodied as an optical power meter, or other devices that can measure the power of the narrow-linewidth laser light output from the active phase-shifted optical fibre grating 13. Compared with the high-precision wavelength demodulation devices with a high price and large volume used in the existing FBG-based temperature sensing systems, in the present example, the optical power meter can be used to detect the change of the output power of the active phase-shifted optical fibre grating 13, to achieve the temperature sensing system inexpensively, with high integration capability and great portability.

Based on the above analyses, in order to more clearly illustrate the technical solutions of the present example, the active phase-shifted optical fibre grating 13 with π phase shift in an asymmetrical structure, which takes the erbium doped optical fibre as the active medium, is used as an example, to illustrate the working principle of the temperature sensor 10 provided in the present example.

In some embodiments, the erbium ion-doped phase-shifter grating of the active phase-shifted optical fibre grating 13 has a length of 4 cm. The pump laser 11 is a 1480 nm semiconductor laser. The wavelength division multiplexer 12 is a 1480 nm/1550 nm wavelength division multiplexer 12. In other words, the first connection port a has an input/output wavelength of 1,480 nm, the second connection port b has an input/output wavelength of 1,550 nm, and the common connection port c has an input/output wavelength of 1,480 nm and 1,550 nm, for example. In some embodiments, the optical isolator 14 is an optical isolator 14 with a 1,550 nm working wavelength. The optical detector 15 can be embodied as an EXFO FPM-600 type optical power meter.

Before using the temperature sensor 10, the relation between the output power of the active phase-shifted optical fibre grating 13 and the ambient temperature of the active phase-shifted optical fibre grating 13 in the temperature sensor 10 can be calibrated. For example, the calibration is performed by a manner specifically as follows.

Figure 5:
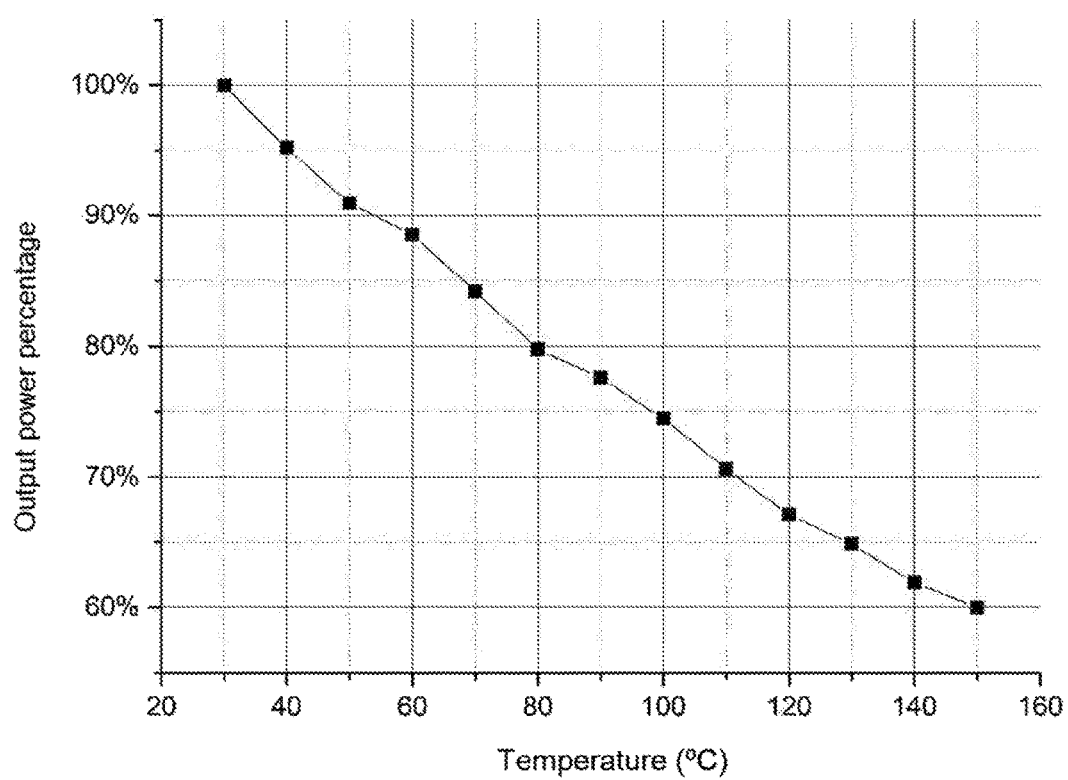
FIG. 5 is a diagram showing a change of output power of the active phase-shifted optical fibre grating provided in the first example of the present invention during a heating process from 30° C. to 150° C.

Setting 10° C. as the temperature rising interval, increasing the ambient temperature of the active phase-shifted optical fibre grating 13 from 30° C. to 120° C.; measuring the output power of the active phase-shifted optical fibre grating 13 as the ambient temperatures of the active phase-shifted optical fibre grating 13 reach 30° C., 40° C., 50° C., 60° C., 70° C., 80° C., 90° C., 100° C., 110° C. and 120° C., respectively; and obtaining a diagram showing the variation of the output powers of the active phase-shifted optical grating 13 during a heating process from 30° C. to 150° C. according to the measured data, as shown in FIG. 5.

It can be seen from FIG. 5 that, during the above heating process, a good linear relation is shown between the temperature and the output power of the active phase-shifted optical fibre grating 13. A linear equation between the output power of the active phase-shifted optical fibre grating 13 and the ambient temperature of the active phase-shifted optical fibre grating 13 can be obtained just by fitting the data in FIG. 5. The equation may be taken as a calibration equation of the temperature sensor 10, and the calibration equation is representative of relation between ambient temperature and detected laser light output power. In order to improve accuracy of the calibration equation, the above experiment also can be conducted for several times to acquire multiple sets of data, and then average the data to obtain a more accurate fit line.

When the temperature sensor 10 is used, as shown in FIG. 1, the pump light of 1,480 nm, output by the semiconductor laser, is input into the first connection port a of the wavelength division multiplexer 12 through a standard 1,550 nm single-mode optical fibre, then output from the common port c of the wavelength division multiplexer 12, and transmitted to the active phase-shifted optical fibre grating 13 through the 1,550 nm single-mode optical fibre. The pump light of 1,480 nm, input into the active phase-shifted optical fibre grating 13, pumps the erbium doped optical fibre, to produce narrow-linewidth laser light. The narrow-linewidth laser light, generated by the active phase-shifted optical fibre grating 13, is transmitted to the common port c of the wavelength division multiplexer 12 through the 1,550 nm single-mode optical fibre, and then output to the input end of the optical isolator 14 through the second connection port b of the wavelength division multiplexer 12.

Finally, the laser light enters the output end of the optical isolator 14, then is transmitted to the input end of the optical power meter through the 1,550 nm single-mode optical fibre. When the ambient temperature of the active phase-shifted optical fibre grating 13, i.e., the environment temperature where it is located, changes, the laser light power received by the optical power meter also will change correspondingly. Further, according to the above preset calibration equation, the environment temperature where the active phase-shifted optical fibre grating 13 is located can be obtained from the laser light power measured by the optical power meter, thus realize temperature sensing.

To sum up, the temperature sensor based on an active phase-shifted fibre grating provided in the examples of the present invention uses the rare earth ion-doped active phase-shifted optical fibre grating 13 with $\pi$ phase shift as a laser resonant cavity and a gain medium, which forms, together with the pump laser 11, a distributed feedback optical fibre laser to output the narrow-linewidth laser light. Since the absorption cross section of the rare earth ions shifts with change of temperature, the gain coefficient of the active fibre changes, and further the output power of the active phase-shifted optical fibre grating 13 changes. Therefore, the relation between the output power of the active phase-shifted optical fibre grating 13 and the ambient temperature of the active phase-shifted optical fibre grating 13 can be further obtained. Thus, the ambient temperature of the active phase-shifted optical fibre grating 13 can be obtained through analyzing the power measured by the optical detector 15, thereby realizing the temperature sensing, and effectively obviating the stress-temperature crosstalk induced measurement inaccuracy in current wavelength demodulation based optical fibre grating sensors. Moreover, the demodulation part of the temperature sensor 10 provided in the examples disclosed herein abandons the conventionally expensive and complex wavelength demodulation device, thus bringing reduced cost, high integration capability and great portability to the whole system.

In addition, in the existing FBG-based temperature sensing systems, the signal intensity of the FBG, which is an optical passive device, is limited by the reflected Amplified Spontaneous Emission at specific wavelength, which is thus very susceptible to signal attenuation and interference in applications of long-distance transmission and multi-sensors array, which in turn leads to a decrease of signal to noise ratio of the whole temperature sensing system. Therefore, compared with the existing FBG-based temperature sensing systems, the active phase-shifted optical fibre grating 13 is an optical active device. With excitation of the pump light emitted by the pump laser 11, the intensity of the narrow-linewidth laser light output is relatively high, and thus the signal to noise ratio is higher, which is favorable and improves the measurement accuracy.

In addition, the temperature sensor provided in the examples of the present invention also has relatively strong extensibility. The sensing portion of the temperature sensor 10 is in full-fiber design, and can simultaneously carry out other sensing applications including micro vibration, pressure and acoustic noise monitoring just by connecting the laser light output signal to corresponding demodulation systems, and using phase noise and linewidth properties specific to the narrow-linewidth laser light signal output by the active phase-shifted optical fibre grating 13, while inheriting the electromagnetic immunity, corrosion resistance, and anti-explosion property of the optical fibre grating sensors.

Figure 6:
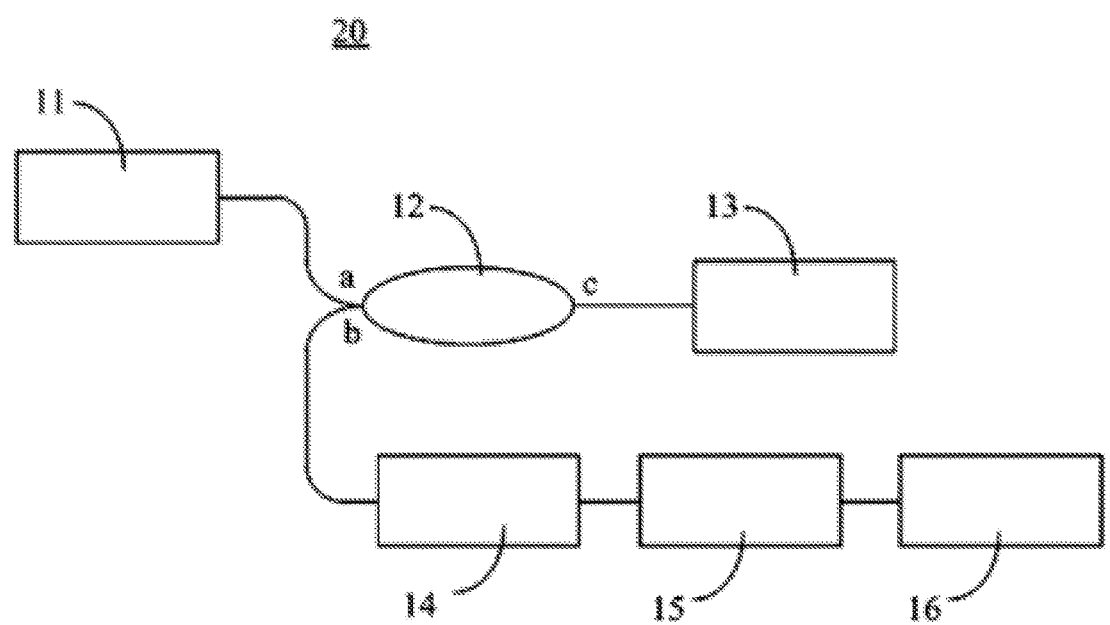
FIG. 6 is a structural schematic view of a temperature sensing system based on an active phase-shifted fibre grating provided in a second example of the present invention.

A second example embodiment of the present invention further provides a temperature sensing system based on an active phase-shifted fibre grating. As shown in FIG. 6, the temperature sensing system 20 comprises a data processing unit 16 and the temperature sensor 10 provided in the above first example.

In this example embodiment, the temperature sensor 10 comprises the pump laser 11, the wavelength division multiplexer 12, the optical detector 15 and the active phase-shifted optical fibre grating 13. Reference can be made to the above first example for the specific embodiment of the temperature sensor 10, and a detailed description is not repeated.

The optical detector 15 is coupled with the data processing unit 16. The pump light emitted by the pump laser 11 passes through the wavelength division multiplexer 12 and enters the active phase-shifted optical fibre grating 13. Laser light, output by the active phase-shifted optical fibre grating 13 after absorbing the pump light, enters the optical detector 15. The optical detector 15 converts the measured power into an electrical signal, which is then sent to the data processing unit 16.

The data processing unit 16 is used to analyze this electrical signal according to a calibrated equation to obtain the ambient temperature of the active phase-shifted optical fibre grating 13. Specifically, this calibrated equation is embodied as the pre-stored relation between the output power of the active phase-shifted optical fibre grating 13 and the ambient temperature of the active phase-shifted optical fibre grating 13 obtained through pre-calibration. For example, when the active medium of the active phase-shifted optical fibre grating 13 is the erbium doped optical fibre, the relation between the output power of the active phase-shifted optical fibre grating 13 and the ambient temperature of the active phase-shifted optical fibre grating 13 obtained through the calibration is a linear relation. In other words, T=kP+b, where P represents the output power of the active phase-shifted optical fibre grating 13, T represents the ambient temperature of the active phase-shifted optical fibre grating 13, and both k and b are constants. Therefore, after the output power of the active phase-shifted optical fibre grating 13 is measured by the optical detector 15, the ambient temperature of the active phase-shifted optical fibre grating 13 can be obtained by using the above linear equation based on the measured output power, thus realizing the temperature sensing. Reference can be made to the above first example for the specific calibration method, and a detailed description of such is therefore not repeated.

In the present example, the data processing unit 16 may be embodied as an integrated circuit chip having signal processing capability, such as a microcontroller, an ARM, a DSP or an FPGA and so on.

On the basis of the first example, in the present example, the data processing unit 16 is additionally provided, and the data processing unit 6 forms an integrated temperature sensing system 20 together with the temperature sensor 10 provided in the first example, and the technical effects of the present example are the same as those of the first example, and a detailed description of such is therefore not repeated.

The above is merely specific embodiments of the present invention, while the scope of protection of the present invention is not limited thereto, and any modifications or substitutions, easily envisaged by one skilled in the art familiar within the present technical field, are covered within the scope of protection of the various embodiments of the present invention disclosed herein. Therefore, the scope of protection of the embodiments of the present invention should be based on the scope of protection provided in the claims.

The invention claimed is:

1. A temperature sensor based on an active phase-shifted fibre grating, comprising:
    a pump laser;
    a wavelength division multiplexer;
    an optical detector; and
    an active phase-shifted optical fibre grating with π phase shift,
    wherein pump light, emitted by the pump laser, is configured to enter the active phase-shifted optical fibre grating through the wavelength division multiplexer;
    the active phase-shifted fibre grating is configured to absorb the pump light and emit laser light, which travels back through the wavelength division multiplexer and enters the optical detector;
    the optical detector is configured to measure output power of the received laser light from the active phase-shifted optical fibre grating, so as to analyze the output power to obtain an ambient temperature of the active phase-shifted optical fibre grating; and
    the output power of the laser light from the active phase-shifted optical fibre grating and the ambient temperature of the active phase-shifted optical fibre grating are in a predetermined relation with each other.

2. The temperature sensor based on an active phase-shifted fibre grating according to claim 1, wherein an active medium of the active phase-shifted optical fibre grating is embodied as an erbium doped optical fibre.

3. The temperature sensor based on an active phase-shifted fibre grating according to claim 2, wherein the pump light has a wavelength of 1,480 nanometers.

4. The temperature sensor based on an active phase-shifted fibre grating according to claim 1, wherein the active phase-shifted optical fibre grating is an active phase-shifted optical fibre grating in an asymmetrical structure.

5. The temperature sensor based on an active phase-shifted fibre grating according to claim 4, wherein a phase shift point of the active phase-shifted optical fibre grating is put closer to a pump light input end of the active phase-shifted optical fibre grating relative to a middle of a grating region of the active phase-shifted optical fibre grating.

6. The temperature sensor based on an active phase-shifted fibre grating according to claim 1, further comprising an optical isolator, wherein:
    the optical isolator is disposed between the active phase-shifted optical fibre grating and the optical detector; and
    the laser light, output by the active phase-shifted optical fibre grating, passes through the optical isolator and enter the optical detector.

7. The temperature sensor based on an active phase-shifted fibre grating according to claim 6, wherein the laser light, output by the active phase-shifted optical fibre grating, passes through the wavelength division multiplexer and the optical isolator in sequence and enters the optical detector.

8. The temperature sensor based on an active phase-shifted fibre grating according to claim 1, wherein the optical detector is embodied as an optical power meter.

9. The temperature sensor based on an active phase-shifted fibre grating according to claim 1, wherein the active phase-shifted optical fibre grating is an active phase-shifted fibre grating obtained by conducting a specific packaging process on an original active phase-shifted optical fibre grating.

10. A temperature sensing system based on an active phase-shifted fibre grating, comprising:
    a data processing unit;
    a temperature sensor based on an active phase-shifted fibre grating, comprising:
        a pump laser;
        a wavelength division multiplexer;
        an optical detector; and
        an active phase-shifted optical fibre grating with π phase shift,
        wherein pump light, emitted by the pump laser, is configured to enter the active phase-shifted optical fibre grating through the wavelength division multiplexer;
        the active phase-shifted fibre grating is configured to absorb the pump light and emit laser light, which travels back through the wavelength division multiplexer and enters the optical detector;
        the optical detector is configured to measure output power of the received laser light from the active phase-shifted optical fibre grating; and
        the output power of the laser light from the active phase-shifted optical fibre grating and the ambient temperature of the active phase-shifted optical fibre grating are in a predetermined relation with each other,
    wherein:
    the optical detector is coupled with the data processing unit;
    the optical detector is configured to convert the measured power into an electrical signal, which is then sent to the data processing unit; and
    the data processing unit is configured to analyze the electrical signal according to a calibrated equation to obtain an ambient temperature of the active phase-shifted optical fibre grating.

11. The temperature sensing system based on an active phase-shifted fibre grating of claim 10, wherein an active medium of the active phase-shifted optical fibre grating is embodied as an erbium doped optical fibre.

12. The temperature sensing system based on an active phase-shifted fibre grating of claim 10, wherein the pump light has a wavelength of 1,480 nanometers.

13. The temperature sensing system based on an active phase-shifted fibre grating of claim 10, wherein the active phase-shifted optical fibre grating is an active phase-shifted optical fibre grating in an asymmetrical structure.

14. The temperature sensing system based on an active phase-shifted fibre grating of claim 10, wherein a phase shift point of the active phase-shifted optical fibre grating is put closer to a pump light input end of the active phase-shifted optical fibre grating relative to a middle of a grating region of the active phase-shifted optical fibre grating.

15. The temperature sensing system based on an active phase-shifted fibre grating of claim 10, wherein:

an optical isolator is disposed between the active phase-shifted optical fibre grating and the optical detector; and the laser light, output by the active phase-shifted optical fibre grating, passes through the optical isolator and enter the optical detector.

16. The temperature sensing system based on an active phase-shifted fibre grating of claim 15, wherein the laser light, output by the active phase-shifted optical fibre grating, passes through the wavelength division multiplexer and the optical isolator in sequence and enters the optical detector.

17. The temperature sensing system based on an active phase-shifted fibre grating of claim 10, wherein the optical detector is embodied as an optical power meter.

18. The temperature sensing system based on an active phase-shifted fibre grating of claim 10, wherein the active phase-shifted optical fibre grating is an active phase-shifted fibre grating obtained by conducting a specific packaging process on an original active phase-shifted optical fibre grating.

* * * * *